US009841768B2

(12) United States Patent
Hiramatsu et al.

(10) Patent No.: US 9,841,768 B2
(45) Date of Patent: Dec. 12, 2017

(54) AUTONOMOUS TRAVELLING SERVICE VEHICLE

(71) Applicant: YANMAR CO., LTD., Osaka-shi, Osaka (JP)

(72) Inventors: Toshifumi Hiramatsu, Osaka (JP); Hideaki Aoki, Osaka (JP); Kouhei Ogura, Osaka (JP)

(73) Assignee: YANMAR CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/129,571

(22) PCT Filed: Mar. 26, 2015

(86) PCT No.: PCT/JP2015/059506
§ 371 (c)(1),
(2) Date: Sep. 27, 2016

(87) PCT Pub. No.: WO2015/147224
PCT Pub. Date: Oct. 1, 2015

(65) Prior Publication Data
US 2017/0131722 A1    May 11, 2017

(30) Foreign Application Priority Data

Mar. 28, 2014   (JP) .................................. 2014-070104
Mar. 28, 2014   (JP) .................................. 2014-070106

(51) Int. Cl.
*G01C 22/00*        (2006.01)
*G05D 1/02*         (2006.01)
(Continued)

(52) U.S. Cl.
CPC ......... *G05D 1/0278* (2013.01); *A01B 69/008* (2013.01); *A01D 75/185* (2013.01);
(Continued)

(58) Field of Classification Search
USPC .......................................................... 701/25
See application file for complete search history.

(56) References Cited

U.S. PATENT DOCUMENTS 6,336,051 B1 *   1/2002   Pangels .............. A01D 41/1278
                                                                  700/207
7,979,174 B2 *   7/2011   Fregene ................ B60W 30/16
                                                                   701/23
(Continued)

FOREIGN PATENT DOCUMENTS

JP          H08221126 A         8/1996
JP          H0994006 A          4/1997
(Continued)

OTHER PUBLICATIONS

International Search Report corresponding to Application No. PCT/JP2015/059506; dated Jun. 23, 2015, with English translation.
(Continued)

*Primary Examiner* — Tyler Paige
(74) *Attorney, Agent, or Firm* — Cantor Colburn LLP

(57) ABSTRACT

In the prior art, detection sensitivity was fixed for an obstacle detection means provided to an autonomous travelling service vehicle; therefore, in the present invention an autonomous travelling service vehicle is provided with a position calculation means that determines the position of the chassis using a satellite positioning system, and with a control device that automatically drives the vehicle along a set travel route and causes the vehicle to execute the service, wherein an obstacle sensor that acts as an obstacle detection means for detecting whether or not an obstacle is present around the autonomous travelling service vehicle and a sensitivity adjustment means for adjusting the sensitivity of the obstacle sensor are provided, and the sensitivity of the obstacle sensor is adjusted by the sensitivity adjustment
(Continued)

means so as to be high within a set work area and low outside the set work area.

22 Claims, 9 Drawing Sheets

(51) Int. Cl.
    *A01B 69/04*     (2006.01)
    *A01D 75/18*     (2006.01)
    *B62D 49/06*     (2006.01)
    *G01S 15/93*     (2006.01)
    *G01S 17/93*     (2006.01)

(52) U.S. Cl.
    CPC ......... *G05D 1/0234* (2013.01); *G05D 1/0238* (2013.01); *B62D 49/06* (2013.01); *G01S 15/931* (2013.01); *G01S 17/936* (2013.01); *G05D 2201/0201* (2013.01)

(56) References Cited

U.S. PATENT DOCUMENTS

| | | | | |
|---|---|---|---|---|
| 8,744,744 B2* | 6/2014 | Takagi | ................. | B60W 40/04 701/301 |
| 2004/0193348 A1* | 9/2004 | Gray | ................... | A01B 69/008 701/50 |
| 2006/0293856 A1* | 12/2006 | Foessel | ................. | B60W 30/09 701/301 |
| 2009/0069938 A1* | 3/2009 | Nishimura | ............. | G05D 1/024 700/255 |
| 2010/0063673 A1* | 3/2010 | Anderson | ............ | G05D 1/0287 701/29.2 |
| 2012/0185123 A1* | 7/2012 | Ansari | ................. | G05D 1/0276 701/25 |
| 2012/0237083 A1* | 9/2012 | Lange | ................ | G06K 9/00805 382/103 |
| 2014/0214271 A1* | 7/2014 | Choi | ....................... | B60R 1/002 701/36 |
| 2017/0135277 A1* | 5/2017 | Hiramatsu | ............ | A01B 69/008 |
| 2017/0139418 A1* | 5/2017 | Hiramatsu | ............ | G05D 1/0214 |

FOREIGN PATENT DOCUMENTS

| | | |
|---|---|---|
| JP | 2000198402 A | 7/2000 |
| JP | 2004008186 A | 1/2004 |
| JP | 2004118469 A | 4/2004 |
| JP | 2005176622 A | 7/2005 |
| JP | 2009232783 A | 10/2009 |
| WO | 2013132712 A1 | 9/2013 |

OTHER PUBLICATIONS

Decision of Refusal for corresponding JP Application No. 2014-070106; dated Jul. 4, 2017.

* cited by examiner

AUTONOMOUSTRAVELLING SERVICE VEHICLE

This is the U.S. national stage of application No. PCT/JP2015/059506, filed on Mar. 26, 2015. Priority under 35 U.S.C. §119(a) and 35 U.S.C. §365(b) is claimed from Japanese Application No. 2014-070104, filed Mar. 28, 2014, and Japanese Application No. 2014-070106, filed Mar. 28, 2014, the disclosures of which are also incorporated herein by reference.

TECHNICAL FIELD

The present invention relates to an art that an obstacle detection means is provided in an autonomously traveling work vehicle which can travel autonomously along a set traveling route using a satellite positioning system and at the time of working while detecting an obstacle, the obstacle detection means detects the obstacle in a set work area and does not detect the obstacle out of the set work area.

BACKGROUND ART

Conventionally, an art that an obstacle sensor is provided in an autonomously traveling work vehicle which can travel autonomously using a GPS positioning system so as to detect an obstacle, and when an obstacle is detected in a traveling direction, an automatic control means controls a position movement means and an agricultural work means so as to avoid the obstacle or be stopped is known (for example, see the Patent Literature 1). An art that a sound notification means is provided so that a driver can recognize easily that route change is performed automatically is known (for example, see the Patent Literature 2).

PRIOR ART REFERENCE

Patent Literature

Patent Literature 1: the Japanese Patent Laid Open Gazette H9-94006
Patent Literature 2: the Japanese Patent Laid Open Gazette 2009-232783

DISCLOSURE OF INVENTION

Problems to be Solved by the Invention

In the above arts, when obstacles are detected continuously within a set distance, the vehicle cannot travel and is stopped. For example, in the case of traveling toward an edge of the field, when an auxiliary person or the like exists in a ridge out of the work area, traveling may be stopped though there is no possibility of collision and the work cannot be continued. Since next operation is not notified by sound, unexpected state may occur suddenly and cannot be understood.

The present invention is provided in consideration of the conditions as mentioned above, and provides an obstacle detection means provided in an autonomously traveling work vehicle which reduces detection sensitivity when detection range thereof reaches an outside of a set work area so as to detect only an obstacle in the work area.

Means for Solving the Problems

The problems to be solved by the present invention have been described above, and subsequently, the means of solving the problems will be described below.

According to the present invention, in an autonomously traveling work vehicle including a position calculation means positioning a position of a vehicle body by using a satellite positioning system, and a control device making the vehicle travel and work automatically along a set traveling route, an obstacle detection means detecting whether an obstacle exists in a circumference of the autonomously traveling work vehicle or not, and a sensitivity adjustment means changing sensitivity of the obstacle detection means are provided, and the control device adjusts the sensitivity of the obstacle detection means by the sensitivity adjustment means so that the sensitivity is high in a set work area and low out of the set work area.

According to the present invention, the control device adjusts the sensitivity by the sensitivity adjustment means so that a detection range of the obstacle detection means is in the set work area.

According to the present invention, the control device adjusts the sensitivity by the sensitivity adjustment means so that the detection range is wide at a center of the set work area and reduced toward an outer perimeter of the set work area.

According to the present invention, an environmental recognition means is connected to the control device, weather is judged corresponding to a detection value of the environmental recognition means, and the sensitivity of the obstacle detection means is changed by the sensitivity adjustment means corresponding to the weather.

According to the present invention, an environmental recognition means and a manual input means are connected to the control device, a direct ray mode is selected by a mode switching means provided in the control device based on a detection value of the environmental recognition means or by input of the manual input means, and the sensitivity is reduced by the sensitivity adjustment means.

According to the present invention, a manual input means and a rain detection sensor as an environmental recognition means are connected to the control device, and when raining is detected by the rain detection sensor or the raining is inputted by the manual input means, the control device reduces the sensitivity by the sensitivity adjustment means.

According to the present invention, a manual input means and an optical sensor as an environmental recognition means are connected to the control device, and when illumination detected by the optical sensor is not more than set illumination and it is judged to be night or it is inputted that it is night by the manual input means, a head light mode is selected by a mode switching means, and a detection value not less than the set illumination is filtered and only the detection value not more than the predetermined value is obtained.

According to the present invention, environment state such as day and night and weather and history of sensitivity adjustment at that time are stored in a storage device provided in the control device.

According to the present invention, a sound notification means is connected to the control device, and when traveling direction or work state is changed, the control device gives preliminary notification of next operation by the sound notification means at a position before a change start position for a set distance.

According to the present invention, the control device notifies actual operation by the sound notification means.

According to the present invention, a light notification means is connected to the control device and next operation and actual operation are notified by the light notification means.

According to the present invention, a display means can be communicated with the control device, and next operation and actual operation are displayed by the display means.

Effect of the Invention

According to the above means, even when an obstacle exists in a ridge, a field or a road out of the work range, the obstacle detection means does not detect the obstacle so as not to give any alarm and not to stop the work and the traveling, and misdetection caused by change of the environment is prevented so as to prevent reduction of workability.

DETAILED DESCRIPTION OF THE INVENTION

An embodiment in which an autonomously traveling work vehicle 1 which can travel autonomously by using a satellite positioning system is a tractor and a rotary tilling device 24 is attached as a work machine to a rear part of the autonomously traveling work vehicle 1 is explained. The work vehicles are not limited to the tractors and may alternatively be combines or the like. The work machines are not limited to the rotary tilling devices and may alternatively be furrowers, mowers, rakes, seeding machines, fertilizing machines, wagons or the like.

Figure 1:
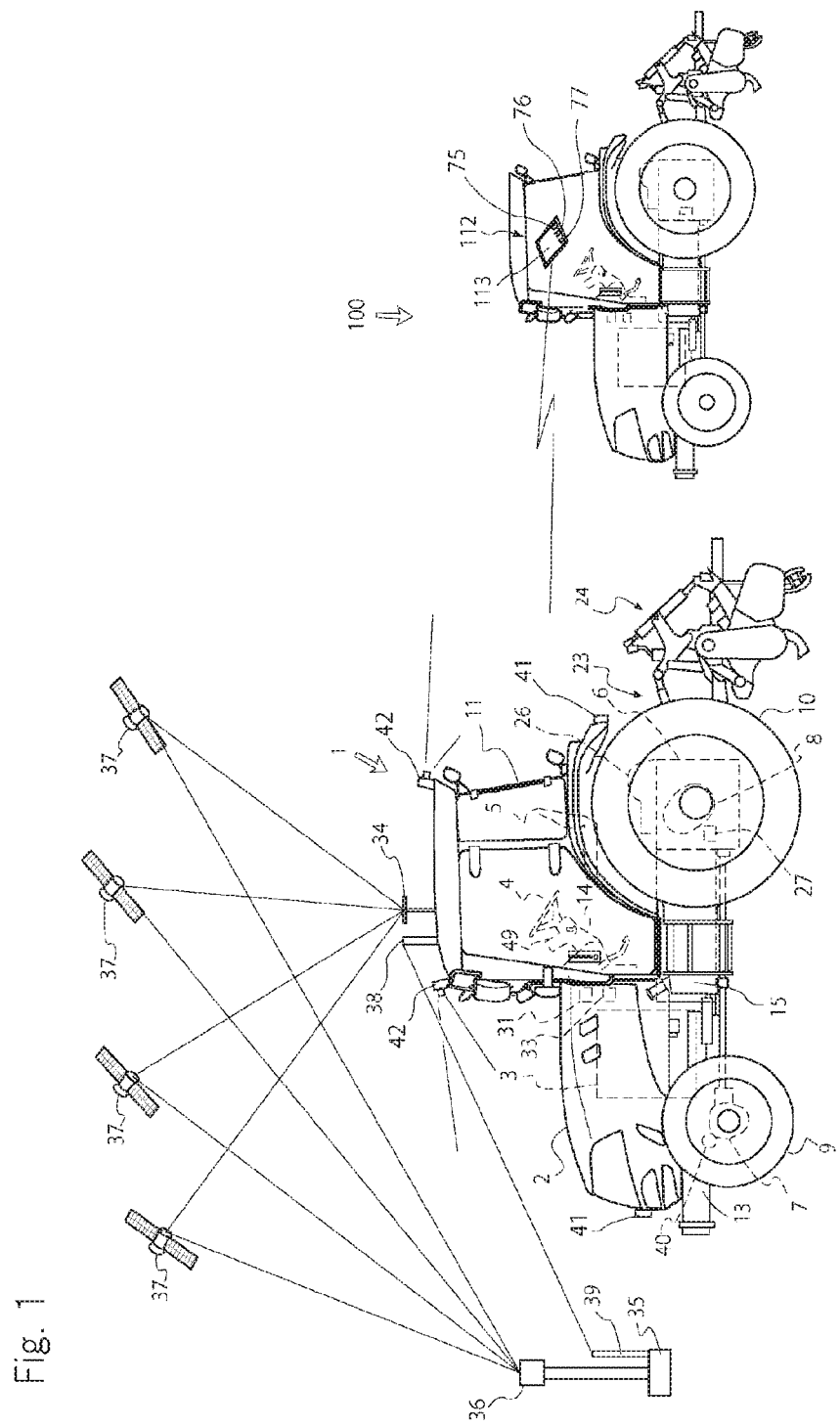
FIG. 1 is a schematic side view of an autonomously traveling work vehicle, a GPS satellite and a reference station.
Figure 2:
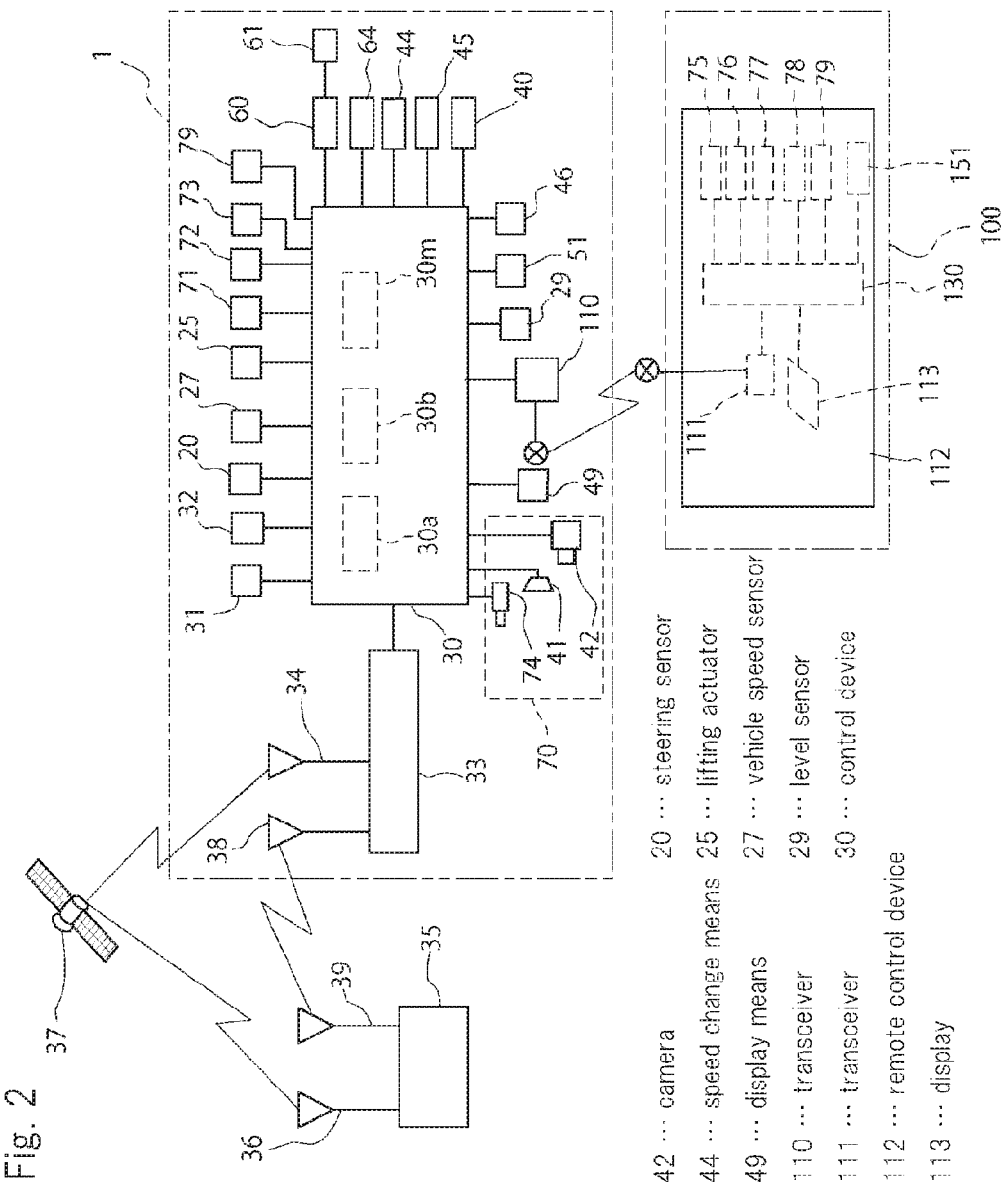
FIG. 2 is a control block diagram.

An entire configuration of the tractor which is the autonomously traveling work vehicle 1 is explained referring to FIGS. 1 and 2. An engine 3 is provided in a bonnet 2, a dashboard 14 is provided in a cabin 11 behind the bonnet 2, and a steering wheel 4 which is a steering operation means is provided on the dashboard 14. By rotating the steering wheel 4, a direction of front wheels 9 is rotated via a steering device. A steering direction of the autonomously traveling work vehicle 1 is detected by a steering sensor 20. The steering sensor 20 includes an angle sensor such as a rotary encoder and arranged at a rotation base of the front wheels 9. A detection configuration of the steering sensor 20 is not limited and any configuration which recognizes the steering direction may alternatively be used. Rotation of the steering wheel 4 may be recognized, or an operation amount of power steering may be recognized. A detection value obtained by the steering sensor 20 is inputted into a control device 30.

A seat 5 is disposed behind the steering wheel 4, and a transmission casing 6 is arranged below the seat 5. At left aid right sides of the transmission casing 6, rear axle casings 8 are provided continuously, and rear wheels 10 are supported via axles by the rear axle casings 8. Power from the engine 3 is changed in speed by a transmission (a main transmission and a sub transmission) in the transmission casing 6 and can drive the rear wheels 10. For example, the transmission includes a hydraulic stepless transmission, and a movable swash plate of a variable capacity hydraulic pump is operated by a speed change means 44 such as a motor so as to perform the speed change. The speed change means 44 is connected to the control device 30. A rotation speed of the rear wheels 10 is detected by a vehicle speed sensor 27, and inputted into the control device 30 as a traveling speed. A detection method of the vehicle speed and an arrangement position of the vehicle speed sensor 27 are not limited.

A PTO clutch, a PTO transmission and a brake device 46 are housed in the transmission casing 6. The PTO clutch is engaged and disengaged by a PTO switching means 45. The PTO switching means 45 is connected to the control device 30 so as to control connection and disconnection of power transmission to a PTO shaft. The brake device 46 is connected to the control device 30 so as to perform braking by operation of an operator or at the time of automatic traveling. The control device has a CPU (central processing unit), a storage device 30m such as a RAM or a ROM, an interface and the like, and programs, data and the like for operating the autonomously traveling work vehicle 1 are stored in the storage device 30m.

A front axle casing 7 is supported by a front frame 13 supporting the engine 3 and the front wheels 9 are supported at both sides of the front axle casing 7 so that power from the transmission casing 6 can be transmitted to the front wheels 9. The front wheels 9 are steering wheels and turned by rotation operation of the steering wheel 4, and the front wheels 9 can be steered laterally by a steering actuator 40 including a power steering cylinder which is a steering driving means. The steering actuator 40 is connected to the control device 30 and driven by automatic traveling control.

An engine controller 60 which is an engine rotation control means is connected to the control device 30, and an engine rotation speed sensor 61, a water temperature sensor, a hydraulic pressure sensor and the like are connected to the engine controller 60 so as to detect a state of the engine. The engine controller 60 can detect a load from a set rotation speed and an actual rotation speed and perform control so as to prevent overload, and can transmit the state of the engine 3 to a remote control device 112 discussed later so as to display the state of the engine 3 on a display 113.

In a fuel tank 15 below a step, a level sensor 29 detecting a level of fuel is arranged and connected to the control device 30. In a display means 49 provided in the dashboard of the autonomously traveling work vehicle 1, a fuel gauge displaying residual amount of fuel is provided and connected to the control device 30. Information about the fuel residual amount is transmitted from the control device 30 to the remote control device 112, and the fuel residual amount and workable time are displayed on the display 113 of the remote control device 112.

On the dashboard 14, the display means 49 displaying a rotation meter of the engine, the fuel gauge, a monitor displaying hydraulic pressure and abnormality, a set value and the like are arranged.

The rotary tilling device 24 is provided movably vertically as the work machine behind a vehicle body of the tractor via a work machine attachment device 23 so as to perform tilling work. A lifting cylinder 26 is provided on the transmission casing 6, and by extending and contracting the lifting cylinder 26, a lifting arm constituting the work machine attachment device 23 is rotated so as to move the rotary tilling device 24 vertically. The lifting cylinder 26 is extended and contracted by a lifting actuator 25, and the lifting actuator 25 is connected to the control device 30.

A mobile communication device 33 constituting a satellite positioning system is connected to the control device 30. A mobile GPS antenna 34 and a data reception antenna 38 are connected to the mobile communication device 33, and the mobile GPS antenna 34 and the data reception antenna 38 are provided on the cabin 11. The mobile communication device 33 has a position calculation means and can transmit latitude and longitude to the control device 30 so as to grasp an actual position. In addition to a GPS satellite (America), by using a global navigation satellite system (GNSS) such as a quasi-zenith satellite (Japan) and a GLONASS satellite (Russia), more accurate positioning can be performed. However, this embodiment is explained with the GPS satellite.

A gyro sensor 31 for obtaining information about change of posture of the vehicle body and an azimuth sensor 32 for detecting a traveling direction are provided in the autonomously traveling work vehicle 1 and connected to the control device 30. The azimuth sensor 32 can be omitted because the traveling direction can be calculated by position measurement of the GPS.

The gyro sensor 31 detects an angle speed of inclination in a longitudinal direction of the autonomously traveling work vehicle 1 (pitch), an angle speed of inclination in a lateral direction thereof (roll) and an angle speed of turning thereof (yaw). By integrating the three angle speeds, the inclination angles in the longitudinal direction and the lateral direction and the turning angle of the autonomously traveling work vehicle 1 can be found. As a concrete example of the gyro sensor 31, a mechanical gyro sensor, an optical gyro sensor, a fluid type gyro sensor, a vibration type gyro sensor and the like are mentioned. The gyro sensor 31 is connected to the control device 30 and inputs information about the three angle speeds to the control device 30.

The azimuth sensor 32 detects a direction of the autonomously traveling work vehicle 1 (traveling direction). As a concrete example of the azimuth sensor 32, a magnetic azimuth sensor and the like are mentioned. The azimuth sensor 32 is connected to the control device 30 and inputs information about the direction of the vehicle body to the control device 30.

As the above, the control device 30 calculates signals obtained from the gyro sensor 31 and the azimuth sensor 32 by a posture-azimuth calculation means so as to find the posture of the autonomously traveling work vehicle 1 (the direction of the vehicle body, the inclination in the longitudinal direction and the lateral direction, and the turning direction).

Next, a method obtaining position information of the autonomously traveling work vehicle 1 by the GPS (global positioning system) is explained.

The GPS is a system developed originally for navigation support of an airplane, a ship and the like, and includes twenty four GPS satellites (four satellites in each of six raceway surfaces) going around at an altitude of about 20,000 km, a control station pursuing and controlling the GPS satellites, and a communication device of an user for positioning.

As a positioning method using the GPS, various methods such as independent positioning, relative positioning, DGPS (differential GPS) positioning and RTK-GPS (real time kinematic GPS) positioning are mentioned, and either of these methods can be used. In this embodiment, a RTK-GPS positioning method (first satellite positioning system) with high accuracy is adopted, and the method is explained referring FIGS. 1 and 2.

The RTK-GPS (real time kinematic GPS) positioning is a method that GPS observation is performed simultaneously at a reference station whose position is known and a mobile station whose position is to be found, data observed at the reference station is transmitted to the mobile station on real time by a method such as wireless communication, and the position of the mobile station is found on real time based on positional results of the reference station.

In this embodiment, the mobile communication device 33, the mobile GPS antenna 34 and the data reception antenna 38 constituting the mobile station are arranged in the autonomously traveling work vehicle 1, and a fixed communication device 35, a fixed GPS antenna 36 and a data transmission antenna 39 constituting the reference station are disposed at a predetermined position not being obstacle of work in the field. In the RTK-GPS (real time kinematic GPS) positioning of this embodiment, measurement of a phase (relative positioning) is performed at both the reference station and the mobile station, and data positioned by the fixed communication device 35 of the reference station is transmitted from the data transmission antenna 39 to the data reception antenna 38.

The mobile GPS antenna 34 arranged in the autonomously traveling work vehicle 1 receives signals from GPS satellites 37. The signals are transmitted to the mobile communication device 33 and positioned. Simultaneously, the signals from GPS satellites 37 are received by the fixed GPS antenna 36 which is the reference station, positioned by the fixed communication device 35 and transmitted to the mobile communication device 33, and the measured data are analyzed so as to determine the position of the mobile station. The position information obtained as the above is transmitted to the control device 30.

Accordingly, the control device 30 of the autonomously traveling work vehicle 1 has an automatic traveling means traveling automatically. The automatic traveling means receives electric waves transmitted from the GPS satellites 37, finds the position information of the vehicle body at set time intervals in the mobile communication device 33, and finds displacement information and azimuth information of the vehicle body from the gyro sensor 31 and the azimuth sensor 32, and controls the steering actuator 40, the speed change means 44, the lifting actuator 25, the PTO switching means 45, the brake device 46, the engine controller 60 and the like so as to make the vehicle body travel along a set route R set previously based on the position information and the azimuth information, thereby working automatically. Position information of an outer perimeter of a field H which is a work range is set previously by a known method and stored in the storage device 30*m*.

An obstacle sensor 41 and a camera 42 as an obstacle detection means are arranged in the autonomously traveling work vehicle 1 and connected to the control device 30 so as to prevent contact with the obstacle. For example, the obstacle sensor 41 includes an infrared sensor or an ultrasonic sensor, arranged at front, side or rear part of the vehicle body and connected to the control device 30 so as to detect whether obstacle exists before, beside or behind the vehicle body. The field and a person, a machine, a container and the like other than the field in an image photted by the camera 42 are analyzed by the control device 30 so as to recognize whether an obstacle exists or not. When the obstacle is detected, control is performed so that an alarm is given and traveling speed is reduced or stopped. Details are described later.

On a roof of the autonomously traveling work vehicle 1, the camera 42 photting a front side and the work machine is mounted and connected to the control device 30. An image photted by the camera 42 is displayed on the display 113 of the remote control device 112 provided in an auxiliary moving work vehicle 100.

The remote control device 112 sets the set traveling route R of the autonomously traveling work vehicle 1, controls the autonomously traveling work vehicle 1 remotely, supervises traveling state of the autonomously traveling work vehicle 1 and operation state of the work machine, and stores work data.

Figure 3:
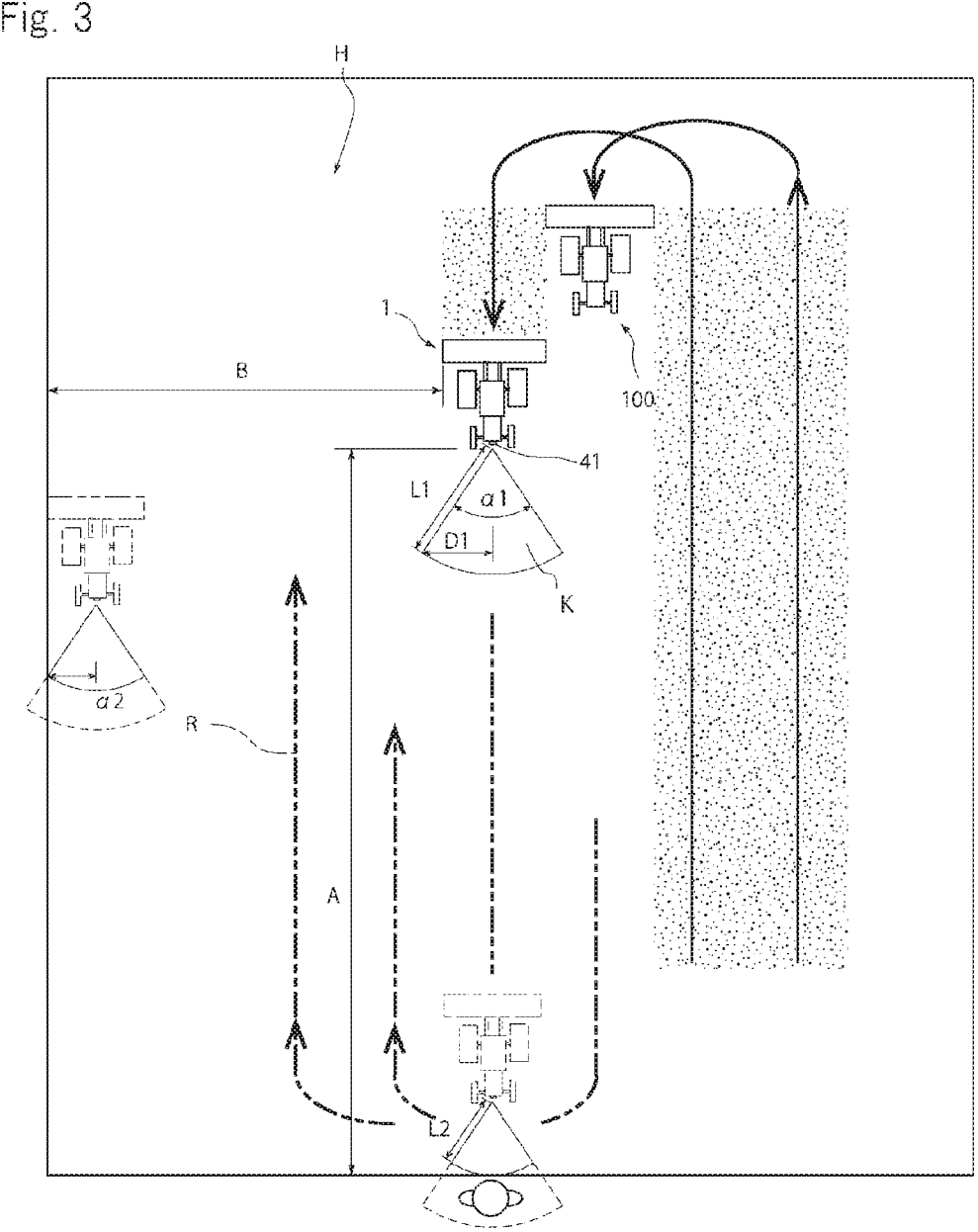
FIG. 3 is a drawing of work state of the autonomously traveling work vehicle and an auxiliary moving work vehicle.

In this embodiment, an operator rides on and operates the auxiliary moving work vehicle 100, and the remote control device 112 is mounted on the auxiliary moving work vehicle 100 so as to operate the autonomously traveling work vehicle 1. As shown in FIG. 3, the auxiliary moving work vehicle 100 travels obliquely backward the autonomously traveling work vehicle 1 while working so as to supervise and operate the autonomously traveling work vehicle 1. The auxiliary moving work vehicle 100 is not limited thereto and may alternatively travel behind the autonomously traveling work vehicle 1 while working corresponding to a work mode. An explanation of a basic configuration of the auxiliary moving work vehicle 100 is omitted because it is substantially the same as the autonomously traveling work vehicle 1. The auxiliary moving work vehicle 100 may have the mobile communication device 33 for the GPS and the mobile GPS antenna 34.

The remote control device 112 can be attached to and detached from an operation part such as a dashboard of the auxiliary moving work vehicle 100 and the autonomously traveling work vehicle 1. The remote control device 112 can be operated while being attached to the dashboard of the auxiliary moving work vehicle 100, can be taken out from the auxiliary moving work vehicle 100 and operated while being carried, or can be operated while being attached to the dashboard of the autonomously traveling work vehicle 1. For example, the remote control device 112 can be configured by a note-type or tablet-type personal computer. In this embodiment, a tablet-type personal computer is used.

Furthermore, the remote control device 112, the autonomously traveling work vehicle 1 and the auxiliary moving work vehicle 100 can be communicated with each other on radio, and transceivers 110 and 111 for the communication are provided respectively in the autonomously traveling work vehicle 1, the remote control device 112 and the auxiliary moving work vehicle 100. The transceiver 111 is configured integrally with the remote control device 112. For example, the communication means can be communicated with each other by wireless LAN such as WiFi. In a surface of a casing of the remote control device 112, the display 113 which is a touch panel-type operation screen which can be operated by touching the screen is provided, and the transceiver 111, a control device 130 (CPU and storage device), a battery and the like are housed in the casing.

The autonomously traveling work vehicle 1 can be operated remotely by the remote control device 112. For example, sudden stop, temporary stop, restart, speed change, change of engine rotation speed, vertical movement of the work machine, engagement and disengagement of the PTO clutch and the like of the autonomously traveling work vehicle 1 can be operated. Namely, an accelerator actuator, the speed change means 44, the brake device 46, the PTO switching means 45 and the like are controlled by the remote control device 112 via the transceiver 111, the transceiver 110 and the control device 30 so that an operator can operate the autonomously traveling work vehicle 1 remotely easily.

An image of the surrounding photted by the camera 42, state of the autonomously traveling work vehicle 1, state of work, information about the GPS, the operation screen and the like can be displayed on the display 113 so as to be supervised by an operator.

The autonomously traveling work vehicle 1 is traveling state, state of the engine, state of the work machine and the like. The traveling state is a speed change position, vehicle speed, fuel residue, battery voltage and the like. The state of the engine is engine rotation speed, load ratio and the like. The state of the work machine is type of the work machine, PTO rotation speed, height of the work machine and the like. These are displayed on the display 113 respectively by numerals, level meters and the like.

The state of the work is a work route (a target route or the set traveling route R), a work process, an actual position, a distance to a headland calculated from the process, a remaining route, number of processes, work time until now, remaining work time and the like. The remaining route can be recognized easily by filling a route worked already in the whole work route. By showing a next process from the actual position by an arrow, a next process such as a turning direction from the actual can be recognized easily.

The information about the GPS is longitude and latitude which is the actual position of the autonomously traveling work vehicle 1, number of grasped satellites, reception radio wave intensity, abnormality of a navigation system, and the like.

Next, sensitivity correction of the obstacle detection means is explained.

The control device 30 has a mode switching means 30a and a sensitivity adjustment means 30b.

The obstacle sensor 41 which is the obstacle detection means is connected to the control device 30, and sensitivity of the obstacle sensor 41 can be changed by the sensitivity adjustment means 30b. The obstacle sensor 41 includes an optical sensor or an ultrasonic sensor and detects an obstacle by detecting light or sound touching the obstacle and reflected.

The obstacle sensor 41 is provided in each of front and rear parts of the vehicle body of the autonomously traveling work vehicle 1. For example, the obstacle sensor 41 provided in the front part of the vehicle body is attached to a front surface of the bonnet 2 and detects an obstacle at the time of forward traveling. The obstacle sensor 41 provided in the rear part of the vehicle body is attached to a rear surface of a fender and detects an obstacle at the time of rearward traveling.

Sensitivity adjustment of the obstacle sensor 41 attached to the front part of the vehicle body is explained referring to FIG. 3.

The obstacle sensor 41 detects whether an obstacle such as a person or an object exists in a predetermined detection range K before the autonomously traveling work vehicle 1 or not. The detection range K is adjusted by the sensitivity adjustment means 30b corresponding to a traveling position in a set work area. Namely, the sensitivity of the obstacle sensor 41 is adjusted by the sensitivity adjustment means 30b so that the sensitivity is high in the set work area and low out of the set work area. By setting the field H as the set work area, a small obstacle is responded sensitively and attention is called to an operator at the time of traveling in the field H, and any obstacle is not detected at the time of detecting out of the field H.

The detection range K of the obstacle sensor 41 is wide at a center of the field H which is the set work area and becomes small toward an outer perimeter of the field H. Concretely, the detection range K is a fan-like shape whose radial distance (detection distance) is L and whose lateral angle is a. A detection width D in a lateral direction from a lateral center of the vehicle body is found from D=L sin(α/2). At the time of traveling in a center of the field H, the detection distance L is a maximum length L1 and the lateral detection width D is a maximum lateral detection width D1. The detection distance L is reduced gradually (L2) toward an edge of the field H, and any obstacle out of the set work area is not detected. Namely, the obstacle sensor 41 is adjusted by the sensitivity adjustment means 30b so that the sensitivity is reduced toward the edge of the field. Since the set work area is set by using the global navigation satellite system before starting the work, a distance to the edge of the field H (the perimeter of the field H) is calculated from the map data and the set traveling route R set before starting the work, and when a distance between a front end of the autonomously traveling work vehicle 1 and the edge of the field is not more than the maximum length L1, the detection range K of the obstacle sensor 41 is adjusted to the distance to the edge of the field by the sensitivity adjustment means 30b. The lateral detection width D is made narrow so as not to detect any obstacle out of the set work area at the time of traveling in a ridge edge. The sensitivity adjustment is not limited and may alternatively be performed by changing and correcting a standard level of a detected value. The detection range K is not limited to be fan-like and may alternatively be circular or rectangular.

Figure 5:
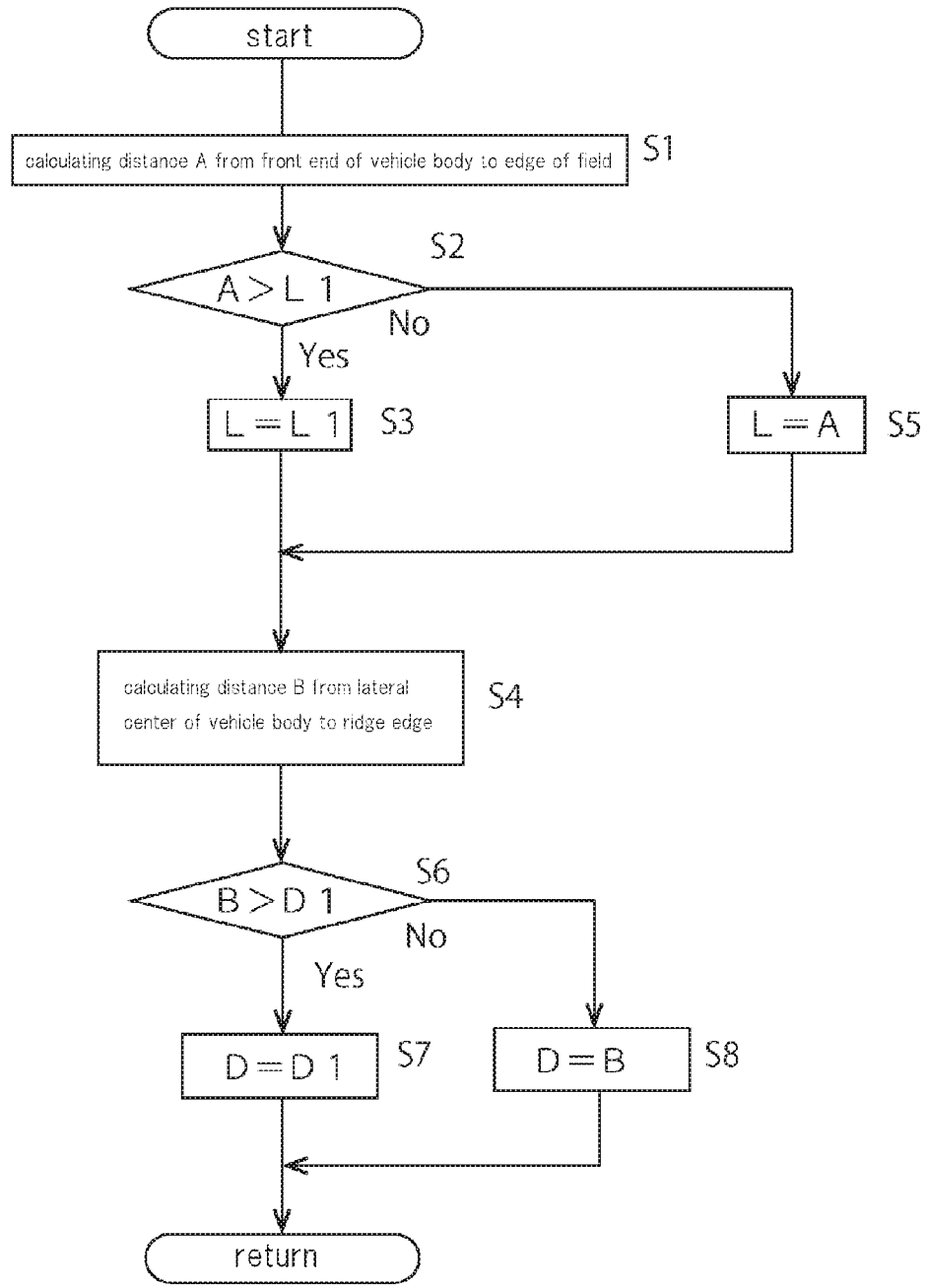
FIG. 5 is a flow chart of detection range correction control.

Sensitivity adjustment control is explained referring to a flow chart of FIG. 5. A distance A from the front end of the vehicle body to the forward edge of the field is calculated (S1), and the distance A to the edge of the field is compared with the maximum length L1 of the obstacle sensor 41 (S2). When the distance A to the edge of the field is longer than the maximum length L1, the detection distance L is maintained at the maximum length L1 (S3) and the control is shifted to a step S4. When the distance A is shorter than the maximum length L1, the detection distance L is adjusted to the distance A to the edge of the field by the sensitivity adjustment means 30b (S5) and the control is shifted to the step S4.

In the step S4, a distance B from a center of the vehicle body to a side ridge edge is calculated (S4). The distance B to the side ridge edge is compared with the maximum lateral detection width D1 (S6). When the distance B to the side ridge edge is longer than the maximum lateral detection width D1, the lateral detection width D is maintained at the maximum lateral detection width D1 (S7). When the distance B to the side ridge edge is shorter than the maximum lateral detection width D1, the lateral detection width D is set to the distance B to the side ridge edge (S8).

However, since an actual work area is not rectangular, has distortion and is trapezoid-like, polygon-like or curved, a certain amount of a permissible range can be provided. Though the detection range K of the obstacle sensor 41 is reduced gradually to the edge of the field, it may be reduced step by step. The detection range K may be reduced to a predetermined small range when the autonomously traveling work vehicle 1 enters a predetermined range near the outer perimeter of the field H (for example, headland turning range).

As the above, in the autonomously traveling work vehicle 1 having the position calculation means positioning the position of the vehicle body by using the satellite positioning system and the control device 30 making the vehicle travel and work automatically along the set traveling route R, the obstacle sensor 41 which is the obstacle detection means detecting whether an obstacle exists near the autonomously traveling work vehicle 1 and the sensitivity adjustment means 30b adjusting the sensitivity of the obstacle sensor 41. The sensitivity of the obstacle sensor 41 is adjusted to be high in the set work area and low out of the set work area by the sensitivity adjustment means 30b. Accordingly, an obstacle is detected widely and attention is called to an operator at the time of traveling in the field H, and any obstacle is not detected when the detection range K is out of the field H, whereby misdetection can be reduced so as to improve workability.

The control device 30 adjusts the sensitivity by the sensitivity adjustment means 30b so as to make the detection range K of the obstacle sensor 41 is in the set work area. Accordingly, even when an obstacle exists in the ridge, the field H or a road out of the work area, the obstacle sensor 41 does not detect the obstacle so as not to give alarm and stop the traveling and the work, whereby detection accuracy is improved and the work can be performed in the ridge edge so as to prevent reduction of work efficiency.

The control device 30 adjusts the sensitivity by the sensitivity adjustment means 30b so that the detection range K is wide in a center of the work area and becomes small toward the outer perimeter of the work area. Accordingly, an obstacle is responded sensitively and detected certainly in the set work area and any obstacle out of the work area is not detected even near the edge of the field, whereby the work can be performed certainly to the edge of the field without stopping the traveling.

An optical sensor 71, an outside air temperature sensor 72 and a rain detection sensor 73 as an environmental recognition means are connected to the control device 30. Weather is judged corresponding to detection values from the optical sensor 71, the outside air temperature sensor 72 and the rain detection sensor 73. Otherwise, a manual input means 79 is connected to the control device 30 and the weather is inputted by the manual input means 79. The input may alternatively be performed by the remote control device 112. The sensitivity of the obstacle sensor 41 is changed by the sensitivity adjustment means 30b corresponding to the weather, whereby misdetection can be prevented so as to improve detection accuracy of the obstacle sensor 41 regardless of the weather.

For example, when illumination detected by the optical sensor 71 is not less than set illumination, direct rays are judged to reach the obstacle sensor 41 and the misdetection may be caused. Then, when the illumination detected by the optical sensor 71 is not less than the set illumination, the control device 30 is switched to a direct ray mode by the mode switching means 30a and the sensitivity is reduced by the sensitivity adjustment means 30b. Otherwise, the direct ray mode is selected by operating the manual input means 79 and the sensitivity is reduced.

In the case in which a person can be detected by the obstacle sensor 41, when outside air temperature is low, temperature of clothes and skin of the person is low and the sensitivity of the obstacle sensor 41 is substantially reduced, whereby the person may be undetectable. Then, when the temperature detected by the outside air temperature sensor 72 is not more than set temperature, the control device 30 is switched to a low temperature mode by the mode switching means 30*a* and the sensitivity of the obstacle sensor 41 is raised by the sensitivity adjustment means 30*b*. Accordingly, detection accuracy of the person is improved.

At the time of raining, the obstacle sensor 41 may detect raindrops. Then, when rain is detected by the rain detection sensor 73, otherwise, when the raining is inputted by the manual input means 79, the control device 30 reduces the sensitivity by the sensitivity adjustment means 30*b* so as to eliminate influence of the rain. Furthermore, when a detection value from the rain detection sensor 73 is not less than a set value of rain, the work is impossible, and when a detection value of the outside air temperature sensor 72 is not more than the set temperature and the rain is detected, it is judged to be snowing and the work cannot be performed, whereby the work is not permitted.

Though the optical sensor 71, the outside air temperature sensor 72 and the rain detection sensor 73 are used as the environmental recognition means for recognizing the environment (weather), it may be configured that weather information is read directly into the control device 30 via internet or the like. Since the information from the internet concerns wide range, it may not rain at an actual position and a weather report may be off, whereby correction is preferably performed with detection by the rain detection sensor 73 or input by the manual input means 79.

When the illumination detected by the optical sensor 71 is not more than the set illumination, it is judged to be night. When the work is performed at night, light of a head light of a car traveling on a road may reach the obstacle sensor 41. In this case, difference of illumination between the time at which the head light strikes the sensor and the time at which the head light does not strike is large, whereby misdetection may occur. Then, when the illumination detected by the optical sensor 71 is not more than the set illumination, otherwise, when it is inputted that it is night by the manual input means 79, the control device 30 is switched to a head light mode (or night mode) by the mode switching means 30*a* so that a detection value not less than the set illumination is filtered and only a detection value not more than the set illumination is obtained, whereby disturbance caused by the head light, nighttime illumination or the like is removed.

In the storage device 30*m* provided in the control device 30, work time, the set work area, environment (day and night and weather) at the time of the work, and history of the sensitivity adjustment at that time are stored and can be displayed optionally. Accordingly, before starting the work, whether state of the rain or the outside air temperature at the paste work in agreement with the actual state exists or not is searched, and when the state in agreement exists, data of the state is read out and whether sensitivity adjustment is performed suitably or not is examined so as to adopt suitable sensitivity adjustment, whereby efficient work can be performed.

Next, processes of the control device 30 in the case in which any obstacle dose not exists though the obstacle sensor 41 detects an obstacle and alarm is given (hereinafter, referred to as "false notification") and in the opposite case in which the obstacle sensor 41 does not detect any obstacle and alarm is not given though an obstacle exists actually (hereinafter, referred to as "notification failure") are explained.

The process of the false notification is explained.

A false notification switch 76 as a false notification means is provided in the remote control device 112 (see FIG. 2), and the false notification switch 76 is connected to the control device 130 of the remote control device 112. The arrangement position of the false notification switch 76 is not limited to the remote control device 112 and may alternatively be an operation part near the seat of the auxiliary moving work vehicle 100 or the autonomously traveling work vehicle 1.

When the obstacle sensor 41 detects an obstacle, alarm sound is given from speakers 51 and 151 as an alarm means and the display means 49 and the display 113 display that the obstacle exists. However, when the obstacle sensor 41 detects the obstacle and gives an alarm, an operator performing confirmation actually may not recognize the obstacle. In this case, the operator turns on the false notification switch 76. By turning on the false notification switch 76, the control device 130 judges that it is false notification, and the control device 130 of the remote control device 112 displays the false notification on the display 113 and simultaneously the alarm from the speaker 51 (151) is canceled via the transceiver 111, the transceiver 110 of the autonomously traveling work vehicle 1 and the control device 30. Accordingly, a useless alarm is prevented and noise caused by the alarm sound is abolished. The alarm means is not limited to the speaker 51 and may alternatively be a buzzer, a horn or the like.

When the work is continued further, and any obstacle does not exist actually though the obstacle sensor 41 detects an obstacle and gives an alarm, the operator turns on the false notification switch 76, and the display is performed and the alarm is given similarly to the above. When the misdetection by the obstacle sensor 41 occurs further and a number of the false notification by the false notification switch 76 reaches a first set number N1, the sensitivity of the obstacle sensor 41 is reduced for a predetermined level by the sensitivity adjustment means 30*b* so as to prevent sensitive detection. The level of reduction of the sensitivity can be set optionally. Accordingly, the sensitivity adjustment is performed automatically so as to prevent frequent occurrence of the false notification.

Subsequently, in the case in which the work is continued while the sensitivity of the obstacle sensor 41 has been reduced, when the misdetection by the obstacle sensor 41 occurs and the number of the false notification by the false notification switch 76 reaches a second set number N2, it is judged that the obstacle sensor 41 is broken, and the breakage is displayed by the display means 49 and the display 113 so as to be recognized by the operator, and the occurrence of the breakage is notified via an internet circuit or the like to a place such as a store or a service station to which repair can be requested. It may alternatively be configured that the control reducing the sensitivity of the obstacle sensor 41 is performed several times and subsequently the notification is performed. Accordingly, judgment of the breakage is performed automatically and the notification of the breakage is also performed automatically.

Figure 6:
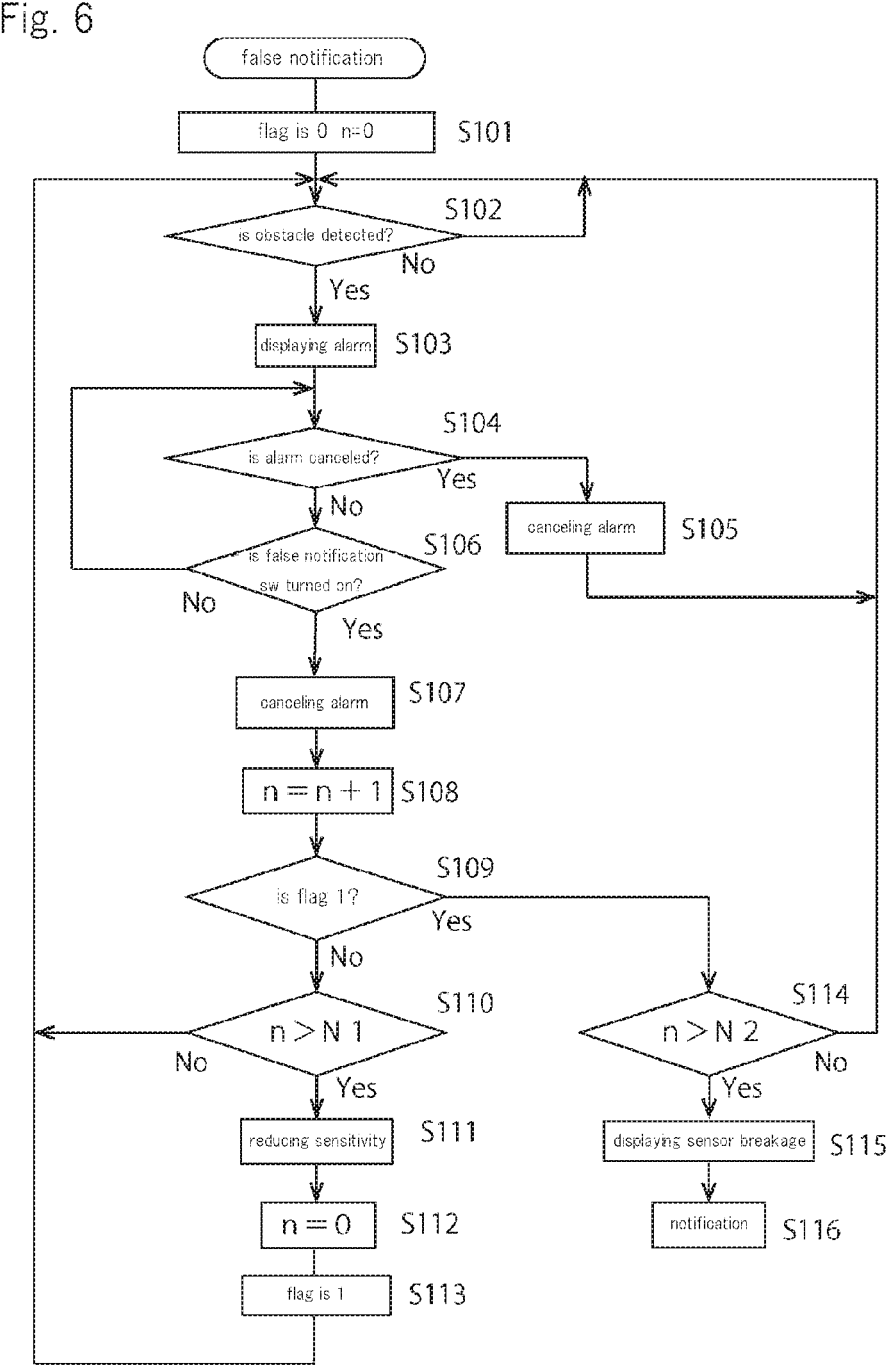
FIG. 6 is a flow chart of false notification control.

Concrete control concerning the false notification is explained referring to a flow chart of FIG. 6.

Firstly, a flag is set to 0 and it is set a false notification number n=0 (S101). Whether the obstacle sensor 41 detects an obstacle or not is judged (S102). When the obstacle sensor 41 detects the obstacle, an alarm is given and displayed (S103). When the obstacle is lost or a cancel switch 75 is operated or not is judged (S104), and when the alarm and the display is canceled (S105), the control returns to the step S102. Since the alarm is not canceled and the false notification switch 76 is pushed when misdetection occurs in the step S104, whether the false notification switch 76 is operated or not is judged (S106). When not operated, the control returns to the step S104. When operated, the alarm and the display are canceled (S107) and the false notification number n is set to be n+1 (S108). When this false notification is a first false notification, it is set n=1. Next, whether the flag is 1 or not is judged. Namely, since the flag is set when the sensitivity is reduced, whether the flag is 1 or not is judged (S109), and when the flag is not 1 (normal detection not reducing the sensitivity), whether the false notification number n is not less than the first set number N1 or not is judged (S110). When the false notification number n is less than N1, the control returns to the step S102. When the false notification number n is not less than the first set number N1, the sensitivity of the obstacle sensor 41 is reduced for the predetermined level (S111) and the false notification number n is set 0 (reset) (S112), the flag 1 is set (S113) and the control shifts to the step S102.

In the step S109, since the sensitivity is reduced when the flag is 1, the control shifts to a step S114 and whether the false notification number n is more than the second set number N2 or not is judged. When the false notification number n is not more than the second set number N2, the control shifts to the step S102. When the false notification number n is more than the second set number N2, it is judged that the obstacle sensor 41 is broken, and the breakage is displayed (S115) and notified to a store or the like (S116).

Next, the process of the notification failure is explained.

A notification failure switch 77 as a notification failure notification means is provided in the remote control device 112, and the notification failure switch 77 is connected to the control device 130. An emergency stop button 78 for emergency stop of the autonomously traveling work vehicle 1 is provided in the remote control device 112 and connected to the control device 130. The arrangement position of the notification failure switch 77 and the emergency stop button 78 is not limited to the remote control device 112 and may alternatively be the operation part near the seat of the auxiliary moving work vehicle 100 or the autonomously traveling work vehicle 1. The emergency stop is stop of the engine 3 so as to made traveling and work impossible.

At the time of forward traveling work, when though an operator recognizes an obstacle by looking in the detection range of the obstacle sensor 41 at a front side of the autonomously traveling work vehicle 1 at the time of forward traveling work (at a rear side thereof at the time of rearward traveling work), the obstacle sensor 41 does not detect the obstacle and does not give any alarm and any display, the operator turns on the notification failure switch 77. By turning on the notification failure switch 77, the notification failure is displayed on the display 113 by the control device 130 of the remote control device 112, and simultaneously the alarm from the speaker 51 is canceled via the transceiver 111, the transceiver 110 of the autonomously traveling work vehicle 1 and the control device 30 so as to stop the traveling and the work. Accordingly, collision with the obstacle is abolished. In the case in which though an obstacle exists, the obstacle sensor 41 does not detect the obstacle and does not give any alarm, when the emergency stop button 78 is pushed, the control device 130 also judges that the notification failure occurs.

When the work is continued further, and though an obstacle exists, the obstacle sensor 41 does not detect the obstacle and does not give any alarm, the operator turns on the notification failure switch 77 (including the emergency stop button 78) so as to stop the traveling and give the alarm and the display similarly to the above. When notification failure number which is number of operation of the notification failure switch 77 caused by the notification failure reaches a third set number N3, the sensitivity of the obstacle sensor 41 is raised for a predetermined level by the sensitivity adjustment means 30b so as to make sensitive. The level of raising of the sensitivity can be set optionally. Accordingly, the sensitivity adjustment is performed automatically so as to prevent frequent occurrence of the notification failure.

In the case in which the work is continued further while the sensitivity of the obstacle sensor 41 is raised, when misdetection by the obstacle sensor 41 occurs and notification failure notification number by the notification failure switch 77 reaches a fourth set number N4, it is judged that the obstacle sensor 41 is broken, and the breakage is displayed by the display means 49 and the display 113 so as to be recognized by the operator, and the occurrence of the breakage is notified via the internet circuit or the like to the place such as the store or the service station to which repair can be requested. It may alternatively be configured that the control reducing the sensitivity of the obstacle sensor 41 is performed several times. Accordingly, judgment of the breakage is performed automatically and the notification of the breakage is also performed automatically.

Figure 7:
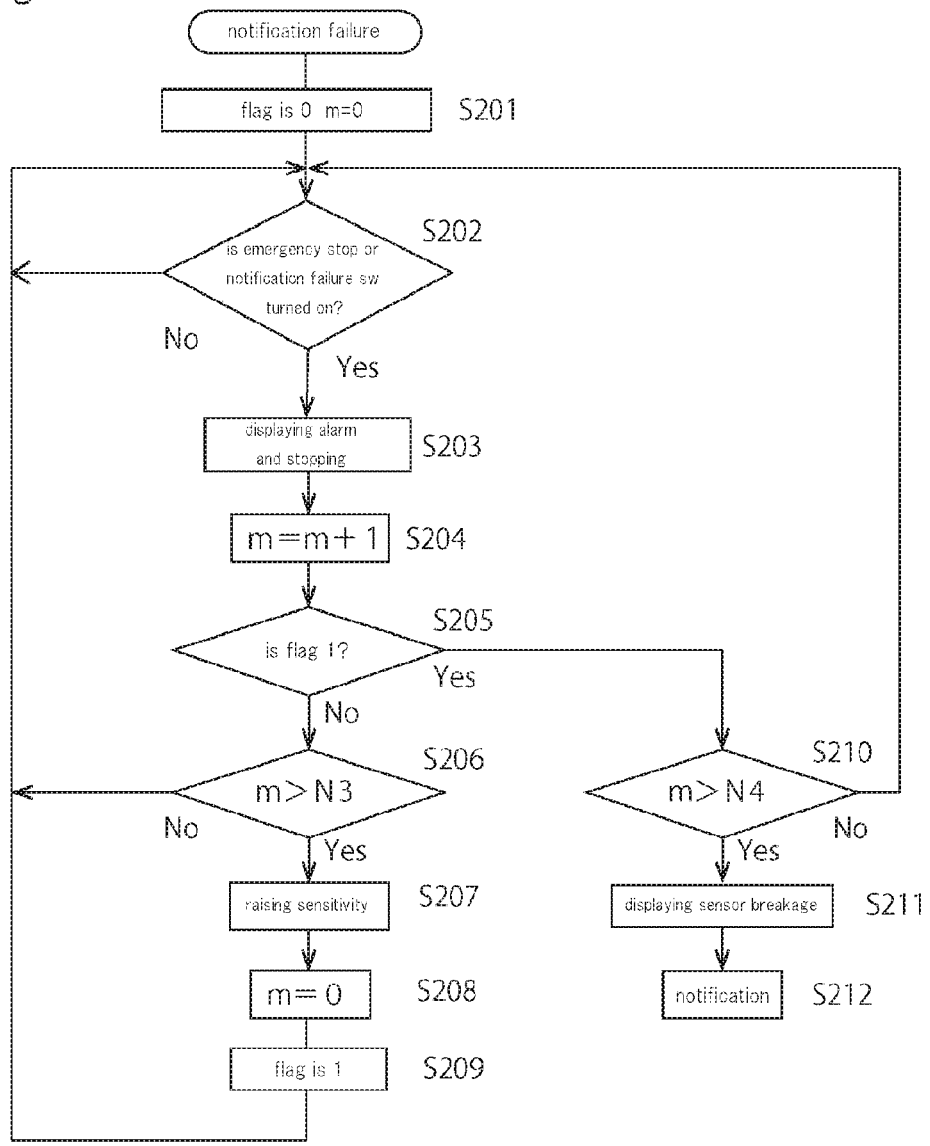
FIG. 7 is a flow chart of notification failure control.

Concrete control concerning the notification failure is explained referring to a flow chart of FIG. 7.

Firstly, a flag is set to 0 and it is set a notification failure number m=0 (S201). Whether an operator operates the notification failure switch 77 (or the emergency stop button 78) or not is judged (S202). When the notification failure switch 77 is operated, the alarm and the display are performed, the vehicle is stopped (S203), and the notification failure number m is set m+1 (S204). Next, whether the flag is 1 or not, that is, whether the sensitivity is raised or not is judged (S205), and when the flag is not 1 (the sensitivity is not raised), whether the notification failure number m is not less than the third set number N3 or not is judged (S206). When the notification failure number m is less than the third set number N3, the control returns to the step S202. When the notification failure number m is not less than the third set number N3, the sensitivity of the obstacle sensor 41 is raised for the predetermined level (S207) and the notification failure number m n is reset (S208), the flag 1 is set (S209) and the control shifts to the step S202.

In the step S205, since the sensitivity is raised when the flag is 1, the control shifts to a step S210 and whether the notification failure number m is more than the fourth set number N4 or not is judged. When the notification failure number m is not more than the fourth set number N4, the control shifts to the step S202. When the notification failure number m is more than the fourth set number N4, it is judged that the obstacle sensor 41 is broken, and the breakage is displayed (S211) and notified to a store or the like (S212).

Next, an art for detecting a person by the obstacle sensor 41 and the camera 42 and avoiding collision of the autonomously traveling work vehicle 1 and the person when the person is detected is explained. A person detection sensor 70 includes the obstacle sensor 41, the camera 42, and a distance sensor 74 detecting distance to the person.

Figure 4:
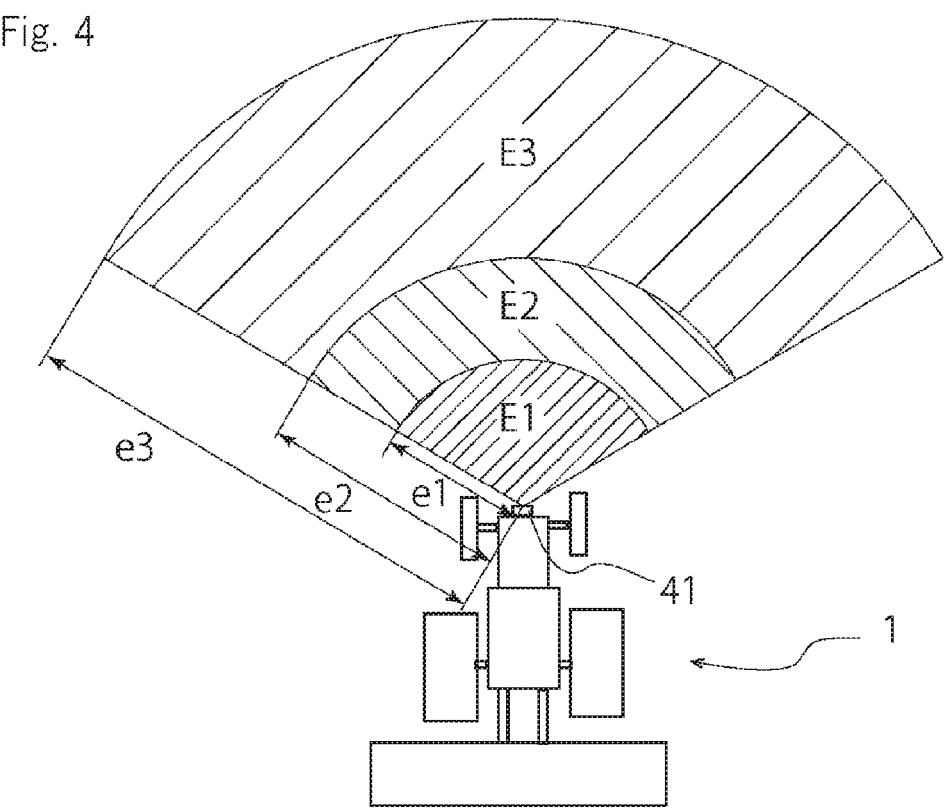
FIG. 4 is a drawing of a control area in a detection range of an obstacle detection means.

At the time of working while traveling autonomously in the field H which is the set work area, when the person detection sensor 70 detects a person in a first range E1 (FIG. 4), the control device 30 gives first alarm sound by the speakers 51 and 151 and gives display by the display means 49 and the display 113 and simultaneously stop the traveling. Namely, when a person runs from the autonomously traveling work vehicle 1 into the first range E1, sudden stop is performed automatically, the first alarm sound is given, and the sudden stop is displayed by the display means 49 and the display 113. The first alarm sound is comparatively loud, has high frequency and is audible to the circumference. A means for the sudden stop is stopping the engine 3 by the engine controller 60, making the speed change means 44 neutral so as to breaking or the like, and the method is not limited. In the case of traveling out of the field or traveling not autonomously, this collision avoiding control by the person detection is not performed and another collision avoiding control is performed.

The first range E1 is a range of the fan-like shape whose diameter is a longest distance e1 from detecting a person to stopping traveling of the vehicle body in the case in which the autonomously traveling work vehicle 1 travels at work speed. Namely, the diameter length e1 which is the longest distance is a longest distance of a length is a sum of a free running distance from detecting a person running into the first range E1 by the person detection sensor 70 to giving a stop signal and operating a braking device and a speed change means and a distance from braking to slipping and stopping. In other words, the first range E1 is a range in which a possibility of collision with a person exists though entering of the person is detected at the time of traveling at the work speed and the sudden stop is performed.

At the time of working while traveling autonomously in the field H, when the person detection sensor 70 detects a person in a second range E2 further than the first range E1, the control device 30 gives second alarm sound by the speaker 51 and reduces traveling speed. Namely, when a person enters the second range E2 further than the first range E1, the speed change means 44 is shifted automatically to a reduction side (in the case of traveling at a first stage, engine rotation speed is reduced by the engine controller 60) so as to reduce traveling speed and gives the second alarm sound. Volume and frequency of the second alarm sound are respectively smaller and lower than those of the first alarm sound so as to make recognition of approach of the autonomously traveling work vehicle 1 easy though it is not more urgent than the first range E1. The alarm sound may be intermittent sound.

The second range E2 is further than the first range E1 and nearer than a third range E3. The third range E3 is a range removing a range of a fan-like shape whose diameter is a longest distance e2 from detecting a person to stopping traveling of the vehicle body in the case in which the autonomously traveling work vehicle 1 travels at on-road traveling speed (high speed) from a range of a fan-like shape whose diameter is a longest distance e3 at which the person detection sensor 70 can detect a person. In other words, it is a range in which the vehicle can be stopped freely without colliding a person can be avoided when the person detection sensor 70 detects the person entering the second range E2 and sudden stop is performed. Accordingly, in the case of traveling at the work speed, by reducing the speed and giving the second alarm sound when the person is detected in the second range E2, the person entering the second range E2 can feel danger and avoid collision easily. When a person enters the first range E1, sudden stop is performed naturally and collision is avoided.

At the time of working while traveling autonomously in the field H, when the person detection sensor 70 detects a person in the third range E3 further than the second range E2, the control device 30 gives a third alarm by the speaker 51 and attracts attention to the person. Namely, when a person goes from the autonomously traveling work vehicle 1 into the third range E3 further than the second range E2, the third alarm is given so as to make the person recognize approach of the autonomously traveling work vehicle 1. The third alarm sound may sound notifying the approach by the speaker 51, rumbling of a horn or lighting of a light so as to attract attention.

The third range E3 is a range removing the first range E1 and the second range E2 from a range in which the person detection sensor 70 can detect a person. Namely, it is a range further than the second range E2 and in which a person can be detected. In other words, it is a range in which a person can perform avoidance action freely.

As the above, when the person detection sensor 70 detects a person in the third range E3 further than the second range E2, the control device 30 gives an alarm and attracts attention to the person. Accordingly, in the case in which a worker recognizing that the autonomously traveling work vehicle 1 is operated performs other agricultural work in the field H or the like, approach of the autonomously traveling work vehicle 1 can be recognized easily and collision avoiding action can be performed suitably.

When the person detection sensor 70 detects a person in the first range E1, the second range E2 or the third range E3, an alarm is given and displayed on the display means, and the alarm and the display are different for each range. Accordingly, a person entering the range in which the person detection sensor 70 can detect the person can recognize easily what degree the autonomously traveling work vehicle approaches and can perform suitably collision avoiding action corresponding to each range.

The cancel switch 75 as a means for canceling the alarm and the display is provided and connected to the control device 30 so that the alarm and the display can be canceled optionally. Accordingly, continuation of the alarm because the person is in the first range E1 though the traveling is stopped can be prevented, and when the alarm is continued though the person in the third range E3 performs the collision avoiding action and when the person is detected and the alarm is given wrongly, the useless alarm can be stopped so as to prevent noise. The cancel switch 75 is provided in the operation part such as the dashboard of the auxiliary moving work vehicle 100 and the autonomously traveling work vehicle 1 and the remote control device 112.

The camera 42 also can detect an obstacle. An image photted by the camera 42 is processed by the control device 30 so as to detect an animal other than a person, and when what is detected is the animal, the sudden stop and the reduction are not performed. Namely, the animal such as a dog, a cat or a bird escapes normally when the autonomously traveling work vehicle 1 approaches, whereby there is almost no possibility of collision. Rather, by approach of the animal to the autonomously traveling work vehicle 1, the person detection sensor 70 may response so that the autonomously traveling work vehicle 1 is reduced or stopped, whereby the work is obstructed. Then, when it is recognized by the image processing from the camera 42 that the animal enters the first range E1, the second range E2 or the third range E3, a signal from the person detection sensor 70 is canceled so as not to reduce or stop the autonomously traveling work vehicle 1. Otherwise, even when the person detection sensor 70 detects the animal, the transmission and the brake device are not operated, and an alarm device is operated and a head light is turned on so as to threaten the animal. Or, when the person detection sensor 70 detects the animal, the image is displayed by the display means 49 and the display 113 and the transmission and the brake device are operated by operation of an operator.

The processing of image photted by the camera 42 by the control device 30 detects a moving object. The moving object is highlighted, and when the moving object is larger than a fixed size and smaller than a person, the moving object is judged to be an animal. When the moving object is as large as a little child, the moving object is judged by the operator.

Next, preliminary notification of next operation in the case in which the autonomously traveling work vehicle 1 travels and works along the set route R is explained referring to FIGS. 1, 2, 8 and 9.

The speaker 51 as a sound notification means is provided in the autonomously traveling work vehicle 1, and the speaker 51 is connected to the control device 30. The speaker 151 as the sound notification means is provided in the remote control device 112, and the speaker 151 is connected to the control device 130. The speaker may be provided in the auxiliary moving work vehicle 100.

In the case in which the autonomously traveling work vehicle 1 travels along the set route R and works, when the traveling direction or work state is changed, the preliminary notification is performed by the speaker 51 and the speaker 151 at a position set before a change start position P of the change, and simultaneously, it is displayed that the position is the set behind on the display means 49 and the display 113. The position set before the change start position P as a timing of the preliminary notification may be a set distance F, or the preliminary notification may be performed before the change start position P for a set time. The preliminary notification is not limited to be once and may be performed step by step by setting a plurality of set distances (set times). The set distance F and the set time can be changed optionally by a set means.

Notification in the case of changing the traveling direction is "the vehicle is turned right", "the vehicle is turned left", "the vehicle is backed", "the vehicle is stopped" and the like. Notification in the case of changing the work state is "the work machine is raised", "the work machine is descended", " . . . work is started (stopped)", " . . . becomes empty soon", " . . . is filled soon" and the like.

At the time of reaching the change start position P, actual operation is notified by the speaker 51 and the speaker 151, and simultaneously, the actual operation is displayed by the display means 49 and the display 113. When the actual operation is finished, the notification and the display of the actual operation are stopped, and it is prepared for next notification. At the time of reaching a point at which notification of a next changing point while notifying the actual operation, the notification of the actual operation is interrupted and priority is given to the preliminary notification. In the case of rotary tilling work, at the change start position P reaching an edge of the field, turning and lifting of the work machine are performed simultaneously. At this time, one of the turning and the lifting is notified preferentially or alternatively.

Figure 8:
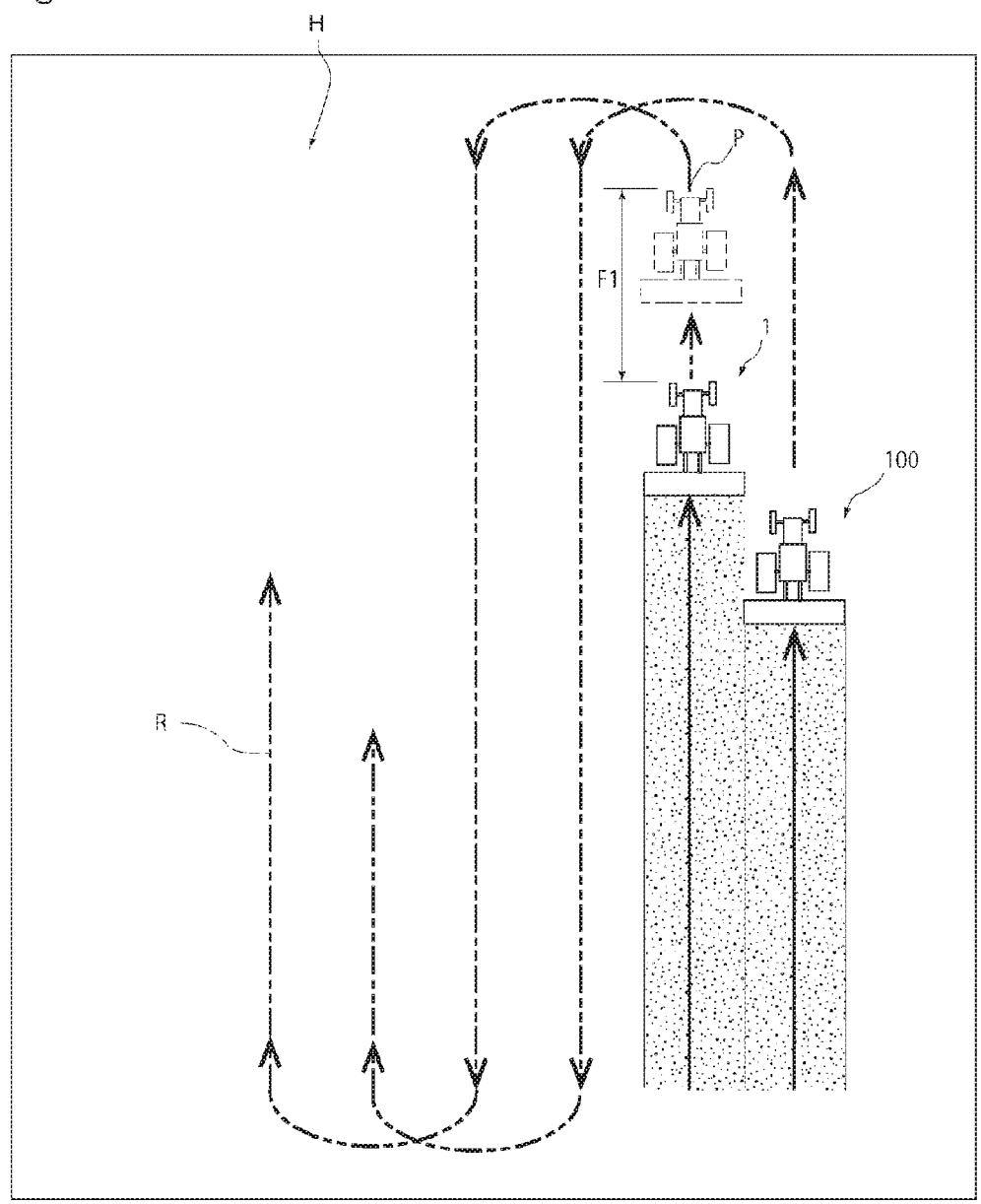
FIG. 8 is a drawing of work state of the autonomously traveling work vehicle and the auxiliary moving work vehicle.
Figure 9:
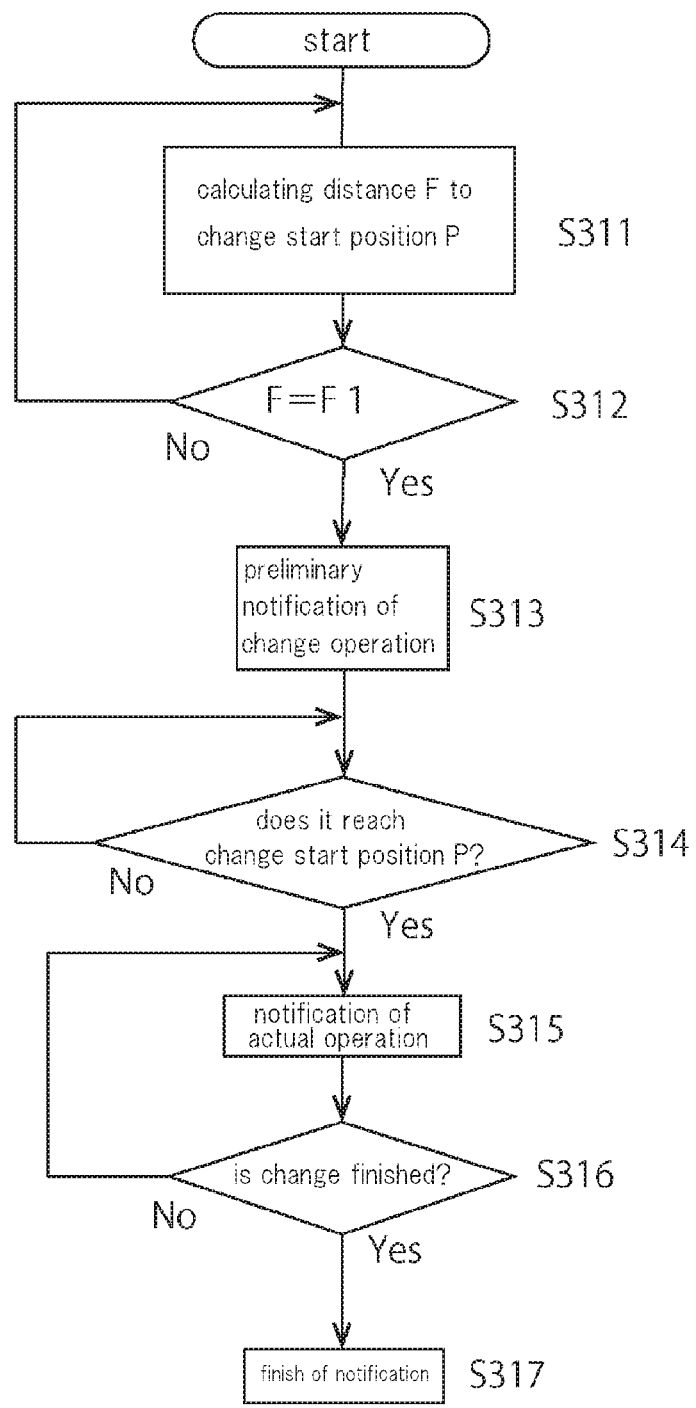
FIG. 9 is a control flow chart of operation notification.

A concrete explanation is given referring to FIGS. 8 and 9. In this embodiment, an explanation of the preliminary notification of work is omitted and the preliminary notification in the case of changing the traveling direction is only explained.

In the case in which the autonomously traveling work vehicle 1 travels along the set route R, the control device 30 calculates a distance to the change start position P (S311) and judges whether a distance F1 to the change start position P reaches the set distance F or not (S312). When the distance F1 to the change start position P reaches the set distance F, the preliminary notification of change of the traveling direction is given by the speaker 51 and the speaker 151 (S313). For example, when reaching a point 10 meters before the edge of the field, notification "the vehicle is turned left soon" is given with sound by the speaker 51 and the speaker 151. In the preliminary notification, a control signal is transmitted from the control device 30 via the transceiver 110 and the transceiver 111 to the control device 130, and a notification signal is transmitted from the control device 130 to the speaker 151, whereby the notification is performed.

At the time of traveling forward further and reaching the change start position P (S314), the actual operation is notified by the speaker 51 and the speaker 151 (S315). For example, sound such as "the vehicle is turned", "the vehicle is backed" or the like is given. When the actual operation is finished (S316), the sound notification is finished (S317).

Accordingly, in the autonomously traveling work vehicle 1 including the position calculation means positioning the position of the vehicle body by using the satellite positioning system, and the control device 30 making the vehicle travel and work automatically along the set traveling route, the speaker 51 which is the sound notification means is connected to the control device 30, and when the traveling direction or the work state is changed, the control device 30 gives the preliminary notification of the next operation by the speaker 51 at the position before the change start position P for the set distance F1. Accordingly, an operator operating the autonomously traveling work vehicle 1 and a worker surrounding the vehicle can recognize easily the next operation of the autonomously traveling work vehicle and are not surprised by sudden turning or backing.

The control device 30 notifies the actual operation by the speaker 51 which is the sound notification means. Accordingly, a worker surrounding the vehicle can recognize the actual operation of the autonomously traveling work vehicle 1 and attention can be given to a person in a dead angle of an operator.

The preliminary notification or the notification of the actual operation can be performed by a light notification means in addition to sound. Concretely, a direction indicator as the light notification means is connected to the control device 30 and lightened at a position before the change start position P for the set distance F1, or a revolving light is provided and revolved and lightened to a turning direction. Otherwise, a display panel 64 as the light notification means is provided and connected to the control device 30 so as to display an arrow to the turning direction or display words. Otherwise, a back light is connected to the control device 30, and at the time of rearward traveling, the back light is lightened and the display panel 64 displays "under rearward traveling".

As the above, the light notification means is connected to the control device 30 and the light notification means notifies the next operation and the actual operation. Accordingly, movement of the autonomously traveling work vehicle 1 can be recognized easily at a distant position.

The display means 49 and the display 113 can be communicated with the control device 30, and the next operation and the actual operation are displayed by the display means 49 and the display 113. Accordingly, the movement of the autonomously traveling work vehicle 1 can be recognized and checked visually optionally at the time of the traveling and the work.

INDUSTRIAL APPLICABILITY

The present invention can be used for a constructional machine or an agricultural work vehicle that a work vehicle works with a satellite positioning system in a predetermined field.

DESCRIPTION OF NOTATIONS 1 autonomously traveling work vehicle
30 control device
30b sensitivity adjustment means
30m storage device
41 obstacle sensor
49 display means
112 remote control device
113 display

The invention claimed is:

1. An autonomously traveling work vehicle comprising:
a position calculation processor positioning a position of a vehicle body by using a satellite positioning system; and
a control device making the vehicle travel and work automatically along a set traveling route,
characterized in that
an obstacle detection sensor detecting whether an obstacle exists in a circumference of the autonomously traveling work vehicle or not, and a sensitivity adjustment processor changing sensitivity of the obstacle detection sensor are provided, and
the control device adjusts the sensitivity of the obstacle detection sensor by the sensitivity adjustment processor so that the sensitivity is high in a set work area and low out of the set work area.

2. The autonomously traveling work vehicle according to claim 1, wherein the control device adjusts the sensitivity by the sensitivity adjustment processor so that a detection range of the obstacle detection sensor is in the set work area.

3. The autonomously traveling work vehicle according to claim 1, wherein the control device adjusts the sensitivity by the sensitivity adjustment processor so that the detection range is wide at a center of the set work area and reduced toward an outer perimeter of the set work area.

4. The autonomously traveling work vehicle according to claim 1, wherein an environmental recognition sensor is connected to the control device, weather is judged corresponding to a detection value of the environmental recognition sensor, and the sensitivity of the obstacle detection sensor is changed by the sensitivity adjustment processor corresponding to the weather.

5. The autonomously traveling work vehicle according to claim 1, wherein an environmental recognition sensor and a manual input device are connected to the control device, a direct ray mode is selected by a mode switch provided in the control device based on a detection value of the environmental recognition sensor or by input of the manual input device, and the sensitivity is reduced by the sensitivity adjustment processor.

6. The autonomously traveling work vehicle according to claim 1, wherein a manual input device and a rain detection sensor as an environmental recognition sensor are connected to the control device, and when raining is detected by the rain detection sensor or the raining is inputted by the manual input device, the control device reduces the sensitivity by the sensitivity adjustment processor.

7. The autonomously traveling work vehicle according to claim 1, wherein a manual input device and an optical sensor as an environmental recognition sensor are connected to the control device, and when illumination detected by the optical sensor is not more than set illumination and it is judged to be night or it is inputted that it is night by the manual input device, a head light mode is selected by a mode switch, and a detection value not less than the set illumination is filtered and only the detection value not more than the predetermined value is obtained.

8. The autonomously traveling work vehicle according to claim 1, wherein environment state such as day and night and weather and history of sensitivity adjustment at that time are stored in a storage device provided in the control device.

9. The autonomously traveling work vehicle according to claim 2, wherein the control device adjusts the sensitivity by the sensitivity adjustment processor so that the detection range is wide at a center of the set work area and reduced toward an outer perimeter of the set work area.

10. The autonomously traveling work vehicle according to one of claim 2, wherein environment state such as day and night and weather and history of sensitivity adjustment at that time are stored in a storage device provided in the control device.

11. The autonomously traveling work vehicle according to claim 9, wherein environment state such as day and night and weather and history of sensitivity adjustment at that time are stored in a storage device provided in the control device.

12. The autonomously traveling work vehicle according to one of claim 3, wherein environment state such as day and night and weather and history of sensitivity adjustment at that time are stored in a storage device provided in the control device.

13. The autonomously traveling work vehicle according to one of claim 4, wherein environment state such as day and night and weather and history of sensitivity adjustment at that time are stored in a storage device provided in the control device.

14. The autonomously traveling work vehicle according to one of claim 5, wherein environment state such as day and night and weather and history of sensitivity adjustment at that time are stored in a storage device provided in the control device.

15. The autonomously traveling work vehicle according to one of claim 6, wherein environment state such as day and night and weather and history of sensitivity adjustment at that time are stored in a storage device provided in the control device.

16. The autonomously traveling work vehicle according to one of claim 7, wherein environment state such as day and night and weather and history of sensitivity adjustment at that time are stored in a storage device provided in the control device.

17. An autonomously traveling work vehicle comprising:
a position calculation processor positioning a position of a vehicle body by using a satellite positioning system; and
a control device making the vehicle travel and work automatically along a set traveling route,
characterized in that
a sound notification processor is connected to the control device, and when traveling direction or work state is changed, the control device gives preliminary notification of next operation by the sound notification processor at a position before a change start position for a set distance.

18. The autonomously traveling work vehicle according to claim 17, wherein the control device notifies actual operation by the sound notification processor.

19. The autonomously traveling work vehicle according to claim 18, wherein a light notification processor is connected to the control device and next operation and actual operation are notified by the light notification processor.

20. The autonomously traveling work vehicle according to claim 18, wherein a display processor can be communicated with the control device, and next operation and actual operation are displayed by the display processor.

21. The autonomously traveling work vehicle according to claim 17, wherein a light notification processor is connected to the control device and next operation and actual operation are notified by the light notification processor.

22. The autonomously traveling work vehicle according to claim 17, wherein a display processor can be communicated with the control device, and next operation and actual operation are displayed by the display processor.

* * * * *